June 4, 1929.  K. J. WERSÄLL  1,715,805

CENTRIFUGAL FRICTION COUPLING OR SLIPPING DEVICE

Filed Oct. 24, 1924

Inventor
Karl J. Wersäll
by his Attorney

Patented June 4, 1929.

1,715,805

UNITED STATES PATENT OFFICE.

KARL JOHAN WERSÄLL, OF STOCKHOLM, SWEDEN, ASSIGNOR TO AMERICAN KAMBI COMPANY, OF NEW YORK, N. Y., A CORPORATION OF DELAWARE.

CENTRIFUGAL FRICTION COUPLING OR SLIPPING DEVICE.

Application filed October 24, 1924, Serial No. 745,727, and in Sweden October 29, 1923.

This invention relates to a centrifugal friction coupling or slipping device for limiting the transmitted effect or turning movement and one wherein the contact bodies are brought to engage with a friction track, either solely by means of the centrifugal force or by the aid of some spring device.

The invention has for its object to provide the friction bodies in such form as to ensure a positive engagement between the body and the track that will not injure the engaging surface when slipping of the clutch occurs and to bring about a practically constant co-efficient of friction in the aggregate.

Friction couplings have hitherto had the weakness not to stand up for slipping in the contact surface. As soon as an obstacle against the sliding movement (dust from wear or the like) has appeared on the track, an outer force raises the pressure considerably at this point so that the foreign matter is pressed into the surfaces, affecting the operation as well as the inner relations of the parts which are changed through wear. These reasons have made it hitherto impossible to design a reliable friction coupling with a constant factor of friction. This invention has for its purpose to give a reliable friction coupling with a constant factor of friction.

Briefly, the present invention relates to a centrifugal friction coupling in which the inner point of engagement between the centrifugal body and the driving part must lie outside a critical point,—i. e., the point of intersection between the engaging surface and a line drawn from the trailing edge at right angles to this surface. The present invention further relates to a centrifugal body having a contact surface located so that all tensions or foreign pressures between the driving and driven parts are eliminated. This condition is contrary to a device showing a rolling contact between the centrifugal body and the driving part, since the contact must be a point or an axial line. If the contact were a point, the pressure of engagement would destroy the material of the contact surface and change the angle of engagement, thus changing the friction force of the clutch.

As to the practical results obtained by the construction hereinafter disclosed, I desire to point out that whereas other constructions have a variation of from ninety to two hundred per cent (90–200%) overload, my device has a variation of but forty to fifty per cent (40–50%) overload, all factors remaining fully constant and the life of the coupling prolonged over three times the length of any other type of coupling, and at the same time it makes a special material for the surface unnecessary, the friction surface remaining polished and without any tendency of grooving.

The invention is shown in the accompanying drawings, wherein—

Figure 1:
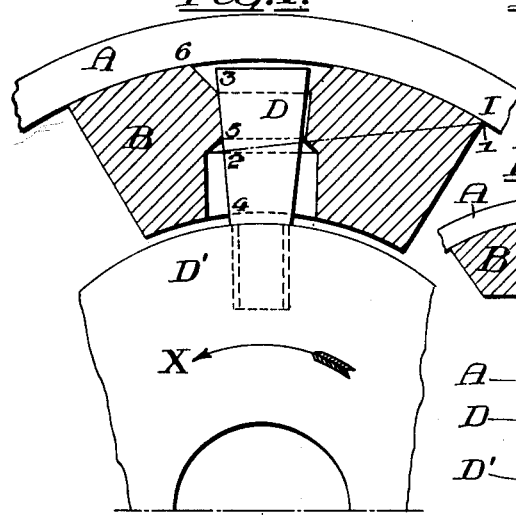
Figure 1 is a sectional view of my improved coupling showing the driver pin of conical shape.

The driver pin D in Fig. 1 is shown conical in shape or form. If the driver $D^1$ rotates in the direction of the arrow X, the edge I is the rear edge of the centrifugal body B. From the point 1 of the edge I a line 1—2 is drawn at right angles to the engaging surface 3—4 between the driver pin D and the centrifugal body B. In order that the coupling shall be able to slip without the track A being injured, the inner contact point 5 between the centrifugal body B and the driver pin D must lie in or outside the critical point 2. At the edge 3 of the driver pin the material of the centrifugal body B is undercut at an angle, as is shown, for example, by the line 3—6. In certain forms of the improvement the driver pin or means connecting the shoe with the driving member or driver is preferably nearer the front end of the shoe, whereby certain advantages in the operation of the improvement are obtained.

The driver pins D may also be of any cross-section suitable,—for example, circular, oval, rectangular, etc. The angle of engagement can be chosen to suit and the length of the guiding surface varied according to the circumstances. The centrifugal bodies can either be operated purely by the centrifugal force or by the aid of spring pressure, and can also be drawn in while at rest by spring arrangements. The bodies can be made to disengage by means of suitable mechanical or spring devices.

Figure 3:
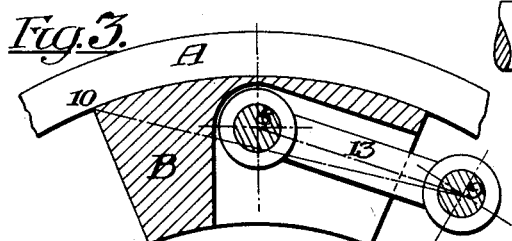
Fig. 3 shows a link construction in cross-section.

In the form of the modification shown in Fig. 3, the pin 9 is fixed to the driver and the pin 8 to the centrifugal body B. The body B is joined to the driver by means of the link 13. In this case the rear edge of the body is indicated at 10, the line from numeral 10 to the center of the pin 9 corresponding to the point 2 of Fig. 1 and the center of the pin 8 corresponding to the point 5 of Fig. 1. In a link coupling, therefore, the center line of the link must fall outside of a line considered and drawn from the center of the driver pin to the rear contact point of the body against the track A.

Figure 4:
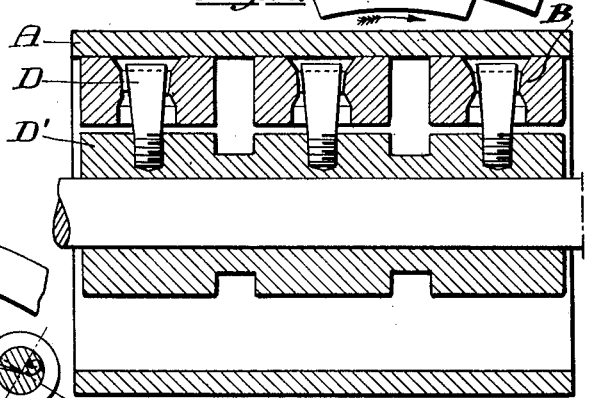
Fig. 4 shows the contact surface placed in front of the main friction body.

In Fig. 4 I have shown the driver pin 14, which is square-shaped in cross-section, placed ahead of the centrifugal body, engaging therewith along a contact surface 3—4. A line 11—12 at right angles to the surface 3—4 will intersect the same at a point 11 which corresponds to the similar point 2, as described in connection with Fig. 1.

Figures 5, 6, 10:
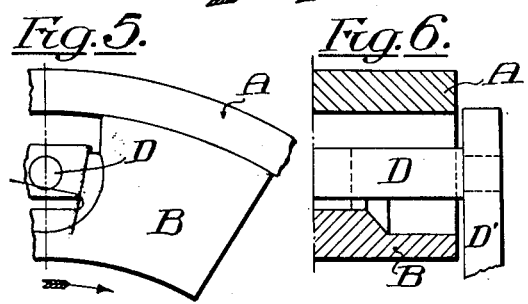
Fig. 5 shows the driver pin inserted into the friction body parallel to the shaft, the pin being fixed in the driver.
Fig. 6 is a cross-sectional view of Fig. 5.
Fig. 10 illustrates the track of the coupling formed into a fly-wheel.

In Figs. 5 and 6 the driver pin is placed axially—or, in other words, parallel to the shaft—being fixed to the driver, the driver D¹ not being shown in Fig. 5.

Figure 7:
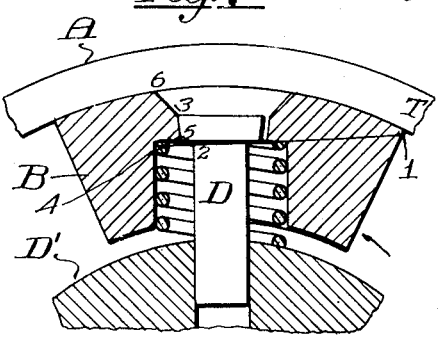
Fig. 7 shows a coupling having spring pressure applied to the friction body auxiliary to the centrifugal force.

In Fig. 7 the spring surrounding the pin D is located in a recess of the shoe B so as to engage such shoe at one end and the driver D' at the opposite end, and in the form shown is so arranged as to assist the engagement of the shoe with the driven member A.

Figure 8:
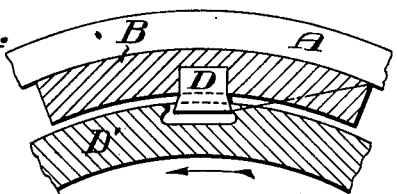
Fig. 8 shows a coupling with the pin fixed to the body.
Figure 2:
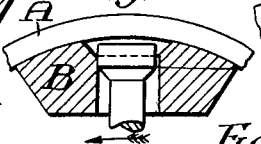
Fig. 2 is a sectional view of this improved coupling showing the driver pin of cylindrical shape.

In Fig. 8 the driver pin is fixedly connected to the body B and is movable against the driver D¹.

Figure 9:
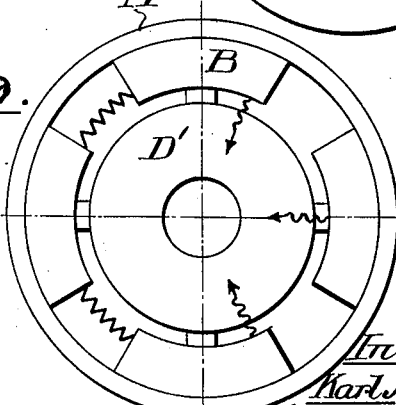
Fig. 9 shows schematically different spring arrangements for drawing in the friction bodies toward the center when the couplings are at rest.

In Fig. 9 various means or arrangements are shown for holding the bodies within a definite number of revolutions, which arrangements may be modified to suit the particular design, the showing in this figure illustrating a series of springs utilized only to draw in the centrifugal bodies when the coupling is at rest.

In Fig. 10 the friction track is formed into a fly-wheel, but it may also be formed into a pulley, gear-wheel, or any suitable secondary arrangement.

Figure 11:
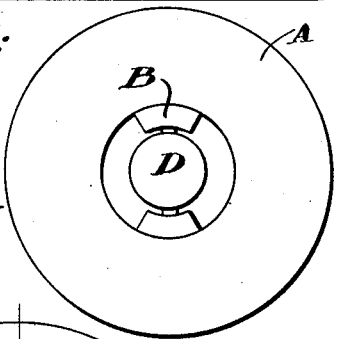
Fig. 11 is a substantially longitudinal, sectional view of one embodiment of the present invention which shows a manifold series of centrifugal bodies and associated parts.

Fig. 11 shows an embodiment similar to Fig. 1 except that a series of centrifugal bodies B and driving pins D are located side by side.

It will be observed that the arcuate length of the contact surface of the shoe or centrifugal body B is comparatively short and does not exceed approximately ninety degrees (90°), which is one of the reasons why the friction surfaces of the track and the shoe are not injured or destroyed and why the shoe does not dig in or injure the track or pins; and, furthermore, that by reason of the construction shown and described the driver and centrifugal body or shoe are so located relatively to each other that the shoe pivots at its rear contact end on the outer friction body or track when such shoe meets an obstruction at the front end, thus permitting the centrifugal body or shoe to move or tilt without binding or cutting into the driver or injuring the friction surface of the track or shoe. It will, therefore, be observed that the shoe is tiltable relatively to its driver or pin by reason of the conical formation of the pin, or, when the pin is otherwise formed, by reason of the clearance space between the pin and the shoe.

It is clear that the forms indicated are only mentioned by way of example and that the invention is not limited to the different details indicated and illustrated.

Many variations of the forms of construction shown are possible within the scope of the invention. For example, the construction can be carried out with a manifold series of centrifugal bodies and corresponding series of tracks.

Having now particularly described and ascertained the nature of the said invention and in what manner the same is to be performed, I declare that what I claim is:

1. A centrifugal friction coupling of the class described in combination with a driver and a tiltable centrifugal body having the arcuate length of its contact surface with the outer friction body not exceeding approximately 90°, a guiding and contact surface between the driver and centrifugal body, and an outer friction body cooperating with the centrifugal body, the inner point of said contact surface lying on one side of the intersection with said surface of a plane considered from the rear contact point of the centrifugal body with the friction body at right angles to said guiding and contact surface, the driver and centrifugal body being so located relatively to each other that said centrifugal body will pivot at its rear contact end on the outer friction body when the centrifugal body meets an obstruction at its front end, thereby to permit movement of the centrifugal body without binding or cutting into the driver.

2. A centrifugal friction coupling of the class described in combination with a driver and a tiltable centrifugal body having the arcuate length of its contact surface with the outer friction body not exceeding approximately 90°, a guiding and contact surface between the driver and centrifugal body and comprising a driver pin within said centrifugal body and having a definite area thereof in frictional engagement with said centrifugal body, and an outer friction body cooperating with the centrifugal body, the inner point of said contact surface lying on one side of the intersection with said surface of a plane considered from the rear contact point of the centrifugal body with the friction body at right angles to said guiding and contact surface, the driver pin and centrifugal body being so located relatively to each other that said centrifugal body will pivot at its rear contact end on the outer friction body when the centrifual body meets an obstruction at its front end, thereby to permit movement of the centrifugal body without binding or cutting into the pin.

3. A centrifugal friction coupling of the class described in combination with a driver and a tiltable centrifugal body having the arcuate length of its contact surface with the outer friction body not exceeding approximately 90°, a guiding and contact surface between the driver and centrifugal body and comprising a driver pin located in said centrifugal body, the centrifugal body and driver pin being movable relatively to each other, and an outer friction body cooperating with the centrifugal body, the inner point of said contact surface lying on one side of the intersection with said surface of a plane considered from the rear contact point of the centrifugal body with the friction body at right angles to said guiding and contact surface, the driver pin and centrifugal body being so located relatively to each other that said centrifugal body will pivot at its rear contact end on the outer friction body when the centrifugal body meets an obstruction at its front end, thereby to permit movement of the centrifugal body without binding or cutting into the pin.

4. A centrifugal friction coupling of the class described in combination with a driver and a tiltable centrifugal body having the arcuate length of its contact surface with the outer friction body not exceeding approximately 90°, a guiding and contact surface undercut in said centrifugal body and disposed between the latter and the driver, a driver pin located within the centrifugal body and having a definite area thereof in frictional engagement with said guiding and contact surface, the centrifugal body and driver pin being movable relatively to each other, and an outer friction body cooperating with the centrifugal body, the inner point of said contact surface lying on one side of the intersection with said surface of a plane considered from the rear contact point of the centrifugal body with the friction body at right angles to said guiding and contact surface, the driver pin and centrifugal body being so located relatively to each other that said centrifugal body will pivot at its rear contact end on the outer friction body when the centrifugal body meets an obstruction at its front end, thereby to permit movement of the centrifugal body without binding or cutting into the pin.

5. In a centrifugal friction clutch, the combination of a driven member, a driving member, a tiltable friction shoe shiftable relatively to said members and having the arcuate length of its contact surface with the driven member not exceeding approximately 90°, and means passing into the shoe for connecting said shoe with the driving member with the connection between said connecting means and shoe comprising extended radial surfaces and located to one side of a predetermined critical point substantially as described thereby to transmit and regulate power from the driving member to the driven member and prevent drag on the driving member, said shoe and means being so located relatively to each other that the shoe will pivot at its rear contact end on the driven member when the shoe meets an obstruction at its front end, thereby to permit movement of the shoe without binding or cutting into said means.

6. In a centrifugal friction clutch, the combination of a driven member, a driving member, a radially mounted conically shaped pin carried by the driving member, and a friction shoe mounted loosely on and shiftable relatively to said pin and having a radially extended contact surface with the pin, and effective to directly engage the driven member thereby to transmit and regulate power from the driving member to the driven member and prevent drag on the driving member.

7. In a centrifugal friction clutch, the combination of a driven member, a driving member, a pin carried by the driving member, a tiltable friction shoe mounted loosely on and shiftable relatively to said pin and having a radially extended contact surface with the pin to transmit and regulate power from the driving member to the driven member and prevent drag on the driving member, said shoe and pin being so located relatively to each other that the shoe will pivot at its rear contact end on the driven member when the shoe meets an obstruction at its front end, thereby to permit movement of the shoe without binding or cutting into the pin, and means between said pin and shoe for preventing the edge of the pin working into the shoe.

8. In a centrifugal friction clutch, the combination of a driven member, a driving member, a pin carried by the driving member, and a tiltable friction shoe mounted loosely on and shiftable relatively to said pin and having a radially extended contact surface with the pin to transmit and regulate power from the driving member to the driven member and prevent drag on the driving member, said shoe and pin being so located relatively to each other that the shoe will pivot at its rear contact end on the driven member when the shoe meets an obstruction at its front end, thereby to permit movement of the shoe without binding or cutting into the pin, said shoe being undercut at an angle at the driving side of the pin for preventing the edge of the pin working into the shoe.

9. In a centrifugal friction clutch, the combination of a driven member, a driving member, a radially mounted conically shaped pin carried by the driving member, a friction shoe mounted loosely on and shiftable relatively to said pin and having a radially extended contact surface with the pin and effective to directly engage the driven member thereby to transmit and regulate power from the driving member to the driven member and prevent drag on the driving member, and means between said pin and shoe for preventing the edge of the pin working into the shoe.

10. In a centrifugal friction clutch, the combination of a driven member, a driving member, a radially mounted conically shaped pin carried by the driving member, and a friction shoe mounted loosely on and shiftable relatively to said pin and having a radially extended contact surface with the pin and effective to directly engage the driven member thereby to transmit and regulate power from the driving member to the driven member and prevent drag on the driving member, and said shoe being undercut at an angle at the driving side of the pin for preventing the edge of the pin working into the shoe.

11. In a centrifugal friction clutch, the combination of a driven member, a driving member, a radially mounted conically shaped pin carried by the driving member, a friction shoe mounted loosely on and shiftable relatively to said pin and having a radially extended contact surface with the pin and effective to directly engage the driven member thereby to transmit and regulate power from the driving member to the driven member and prevent drag on the driving member, and resilient means for assisting in shifting said shoe.

12. In a centrifugal friction clutch, the combination of a driven member, a driving member, a radially mounted conically shaped pin carried by the driving member, a friction shoe mounted loosely on and shiftable relatively to said pin and having a radially extended contact surface with the pin and effective to directly engage the driven member thereby to transmit and regulate power from the driving member to the driven member and prevent drag on the driving member, and resilient means for assisting in shifting said shoe, said shoe being undercut at an angle at the front side of the pin for preventing the edge of the pin working into the shoe.

13. In a centrifugal friction clutch, the combination of a driven member and a driving member, a radially mounted conically shaped pin carried by the driving member, and a friction shoe mounted loosely on and shiftable relatively to said pin to transmit and regulate power from the driving member to the driven member and prevent drag on the driving member, said pin and shoe having radially extended contacting surfaces located to one side of a predetermined critical point substantially as described.

14. In a centrifugal friction clutch, the combination of a driven member and a driving member, a radially mounted conically shaped pin carried by the driving member, and a friction shoe mounted loosely on and shiftable relatively to said pin to transmit and regulate power from the driving member to the driven member and prevent drag on the driving member, said pin and shoe having radially extended contacting surfaces located to one side of a predetermined critical point substantially as described, and said shoe being undercut at an angle at the front side of its pin for preventing the edge of the pin working into the shoe.

15. In a centrifugal friction clutch, the combination of a driven member and a driving member, a radially mounted conically shaped pin carried by the driving member, a friction shoe mounted loosely on and shiftable relatively to said pin to transmit and regulate power from the driving member to the driven member and prevent drag on the driving member, said pin and shoe having contacting surfaces located to one side of a predetermined critical point substantially as described, and said shoe being undercut at an angle at the front side of its pin for preventing the edge of the pin working into the shoe, and resilient means cooperating with the shoe for assisting in shifting said shoe.

16. In a centrifugal friction clutch, the combination of a driving member comprising a hub, a driven member concentric with said hub, a radially mounted conically shaped pin carried by said hub, and a segmentally formed friction shoe having its inner surface conforming to the outer periphery of the hub and its outer surface conforming to the inner periphery of the driven member and mounted loosely on and shiftable relatively to said pin to transmit and regulate power from the driving member to the driven member and prevent drag on the driving member, said shoe being tapered or undercut at an angle adjacent to its pin to prevent the edge of the pin working into the shoe.

17. In a centrifugal friction clutch, the combination of a driven member, a driving member, a tiltable friction shoe shiftable relatively to said members, and means located nearer the front end of the shoe for connecting said shoe with the driving member and having with the shoe a relatively radially extended contact surface located substantially at right angles to a line intersecting the plane of contact of such surface and the rear contact point of the shoe with the driven member, whereby the contact surface of the shoe and connecting means is located outside of a predetermined critical point, said shoe and means being so located relatively to each other that the shoe will pivot at its rear contact end on the driven member when the shoe meets an obstruction at its front end, thereby to permit movement of the shoe without binding or cutting into said means.

18. In a centrifugal friction clutch, the combination of a driven member, a driving member, a tiltable friction shoe shiftable relatively to said members and having the arcuate length of its contact surface with the driven member not exceeding approximately 90°, and means passing into the shoe for connecting said shoe with the driving member, with the connection between said connecting means and shoe comprising extended, radial, parallel surfaces, said shoe and means being so located relatively to each other that the shoe will pivot at its rear contact end on the driven member when the shoe meets an obstruction at its front end, thereby to permit movement of the shoe without binding or cutting into said means.

19. In a friction clutch of the class described, the combination of a driven member, a driving member, a tiltable friction shoe shiftable relatively to said members and having the arcuate length of its contact surface with the driven member not exceeding approximately 90°, and means connecting the shoe with the driving member, said shoe being tiltable relatively to its connecting means, with the inner point of the contact surface between said connecting means and shoe located outside of a predetermined critical point substantially as described.

20. In a friction clutch of the class described, the combination of a driven member, a driving member, a friction shoe shiftable relatively to said members and having the arcuate length of its contact surface not exceeding approximately 90°, and means connecting said shoe with the driving member with the inner point of the contact surface between said connecting means and shoe located outside of a predetermined critical point substantially as described.

21. In a friction clutch of the class described, the combination of a driven member, a driving member a tiltable friction shoe shiftable relatively to said members, and having the arcuate length of its contact surface not exceeding approximately 90°, and means connecting the shoe with the driving member and located nearer the front end of the shoe, said shoe being tiltable relatively to its connecting means, with the inner point of the contact surface between said connecting means and shoe located outside of a predetermined critical point substantially as described.

22. In a friction clutch of the class described, the combination of a driven member, a driving member, a tiltable friction shoe shiftable relatively to said members and having the arcuate length of its contact surface with the driven member not exceeding approximately 90°, and means connecting the shoe with the driving member and located nearer the front end of the shoe, said shoe being tiltable relatively to its connecting means, with the inner point of the contact surface between said connecting means and shoe located outside of a predetermined critical point substantially as described.

In testimony whereof I have signed my name to this specification.

KARL JOHAN WERSÄLL.